Patented Jan. 23, 1945

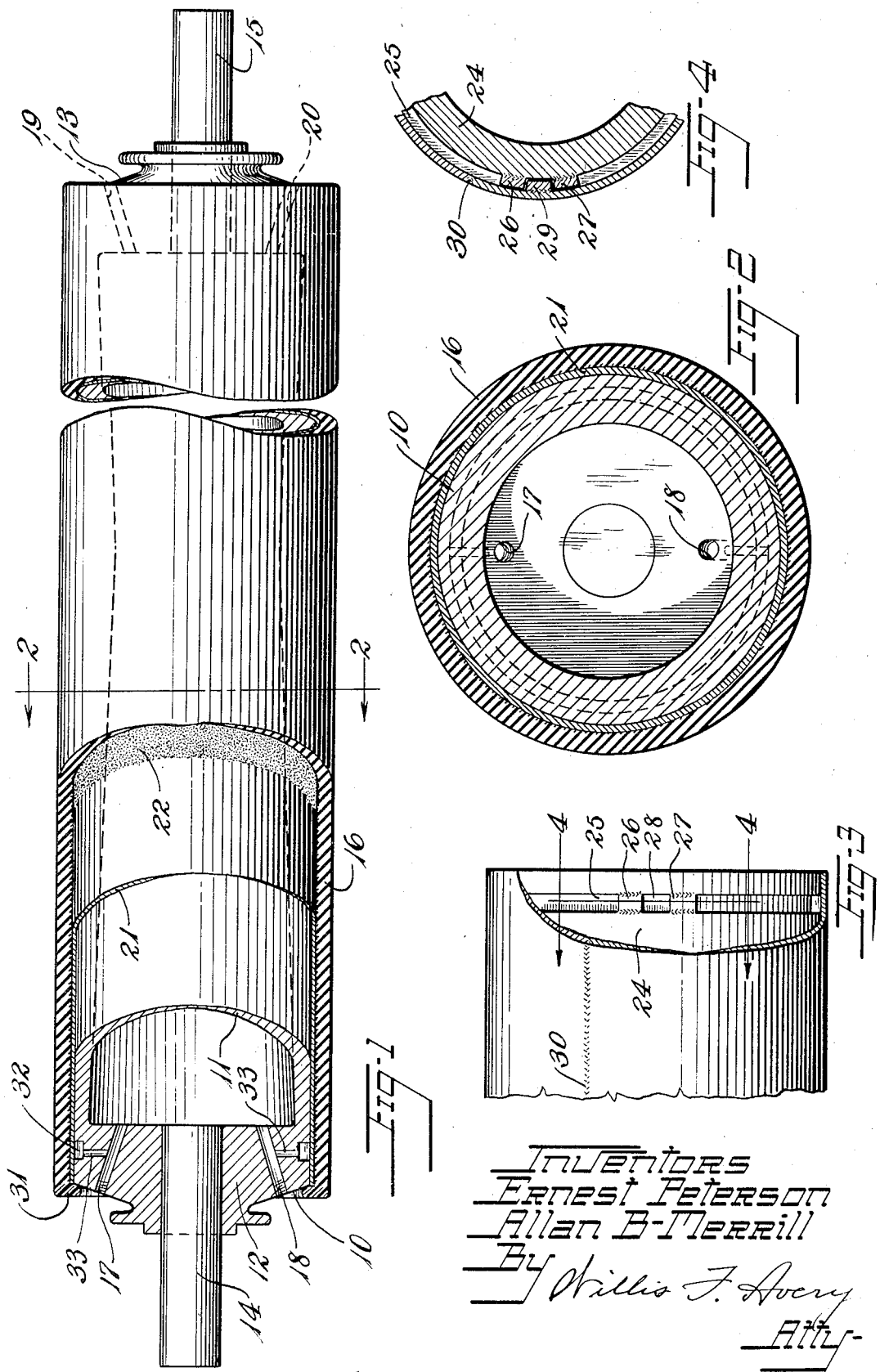

2,367,796

UNITED STATES PATENT OFFICE 2,367,796

COMPOSITE ROLL

Ernest Peterson, Cuyahoga Falls, and Allan B. Merrill, Akron, Ohio, assignors to The B. F. Goodrich Company, New York, N. Y., a corporation of New York Application June 8, 1939, Serial No. 278,094

7 Claims. (Cl. 92—49)

This invention relates to composite rolls having a cushioned face of rubber-like material.

The manufacture of rolls having a cushion face of rubber-like material has involved many difficulties especially where the rolls are of large dimensions and have cores of porous material, or of other material to which it is difficult to adhere rubber. Rubber covered rolls of great dimensions such as press rolls, suction press rolls, and the like, are used in the papermaking industry and in other industries rubber covered rolls of large dimensions are required. These rolls because of their great size and necessary weight and strength are usually provided with hollow cores of cast iron or other porous cast metal. Heretofore the operations of covering such cores with unvulcanized rubber and vulcanizing and bonding the rubber to the cores have been rendered difficult and in some cases impossible by the fact that gases have formed during casting of the core and have become entrapped in the pores of the metal, or would be formed sometimes from chemical reaction of the metal of the core or shell with material in the rubber composition and would be released at the interface causing blow pockets and separation to occur in the cushion and between the rubber and the metal either during vulcanization of the rubber or thereafter when the roll was in use.

These difficulties have been present both in the case of covering new cores and in the case where old cores have been returned to the rubber manufacturer for stripping off the remains of the old rubber and covering the old cores.

While in some cases, the difficulties of covering a porous core or a shell of material to which it is difficult to vulcanize soft rubber, has been to some extent overcome by applying a thick layer of hard rubber composition to the core and building the remainder of the covering of softer cushion rubber, the thick layer of hard rubber required is expensive and permits use of only a shallow face layer of cushion rubber, not permitting the use of such a depth of cushioning material as would be possible to be securely applied to a solid smooth faced impervious core by improved methods of bonding, thereby detracting from the cushioning properties of the roll, it being understood that it is usually desired to hold the outside diameter of the roll to a certain dimension within close limits. Also the hard rubber layer has not always been effective in overcoming blowing or blistering of the covering.

A roll which has been recovered a number of times often has been considerably reduced in diameter due to repeated machining operations employed in removing the old coverings and preparing the surface for the new covering, thereby requiring application of a greater amount of rubber to restore it to proper size than has been necessary for proper cushioning of the roll face, and also weakening the hollow core to an undesirable extent.

In an effort to conduct the gases from the interface of rubber and metal, it has been proposed to turn a coarse thread in the face of the core and to lay fibrous strings between the rubber and metal. These expedients however have resulted in ridges being formed in the rubber so that the cushions have been usually of non-uniform cushioning properties, and have not always been successful in providing for escape of the gases.

In accordance with the present invention we provide a non-pervious layer of dense metal over the entire face of the roll, preferably in such manner as to vent gases from the face of the core from beneath the impervious layer, the impervious layer being of material to which rubber may be bonded without blowing.

The principal objects of the present invention are to provide security of bonding of the cushion to a roll core, and especially to provide such security despite porosity of the core, to provide a maximum depth of cushioning material without increasing the size of the roll, to provide for effectively venting gases during the vulcanization of the roll, to reduce the cost of manufacture, to provide for building up a roll which has been reduced in diameter through a plurality of cover removing and recovering operations, and to provide facility and economy of procedure in the manufacture and repair thereof.

These and other objects will appear from the following description and the accompanying drawing, Of the drawing Fig. 1 is a face view of a roll embodying the invention, parts being broken away and parts shown in section to show its construction.

Fig. 2 is a cross sectional view thereof taken on line 2—2 of Fig. 1.

Fig. 3 is a view of a roll showing a modified form of fastening means, part of the shell being broken away to show the securing recesses, the other parts being broken away.

Fig. 4 is a section taken on line 4—4 of Fig. 3.

Referring to the drawing, the numeral 10 designates the metallic core of a roll having a cylindrical wall 11 and integral end walls 12, 13 the end walls having trunnions 14, 15 adapted to rotatably support the roll.

The cushion or covering of rubber-like material is designated by the numeral 16 and is vulcanized in place on the roll. Vulcanizing heat may be applied to the roll by drilling and tapping openings 17, 18, 19, 20 through the ends of the roll to communicate with the hollow center and to admit steam or other heating mediums, to the roll through pipes screwed into some of the openings, while permitting condensate and gases to escape through pipes connected to others.

To provide means for securing the rubber to the roll core 10, despite the porosity of the same, a shell 21 of dense metal, such as steel, to which the rubber may be readily adhered, is applied over the cylindrical surface of the porous metal and secured thereto and a layer 22 of rubber-to-metal bonding material, such for example as a rubber derivative of the type described in the Fisher Patent No. 1,605,180, or a layer of rubber adherent metal, such as brass or other bonding material is applied to the outer surface of the dense metal layer prior to the application of the rubber. This construction results in a gas venting space between the shell and the core existing by virtue of the roughness of the contacting surfaces, especially the roughness of the cast roughly turned material of the core. If desired the core may be roughly machined or turned to facilitate the provision of the gas passage while at the same time providing adequate contact surface for supporting and securing the shell in place. The metal shell 21 may be formed as a tube and may be shrunk over the core of the roll or otherwise secured thereto as by welding, brazing, keys, rivets, or screws. However, as the rolls are not always of such dimensions as to make possible the use of standard sizes of seamless pipe or tubing, a convenient method is to roll a sheet of dense metal to the proper curvature and to secure it in place by welding, any seams being welded together upon the roll. The shell 21 may be made in one or more pieces as by forming it in concave segments and welding these together and to the roll at their margins to provide a complete cylindrical surface of rubber adherent material about the roll core. The metal shell 21 may be ground or machined truly cylindrical after it has been applied, if desired. This metal may be relatively thin as compared to the covering of cushioning rubber so that a maximum amount of cushioning is provided.

A convenient alternative method of securing the shell 21 to the roll core 10 is by bonding the shell to the roll core, for example, by use of a thermoplastic material such as one of the rubber derivatives described in the Fisher Patent No. 1,605,180. For this purpose the roll core 10 may be coated with a layer of cement of the type mentioned in the Fisher patent and the shell 21 may be similarly coated on its interior before the shell is placed over the roll. Where the shell is applied in sections, each section may be coated with the cement and adhered in place, the sections being adhered to each other and not requiring use of welding. The shell or shell sections so treated is protected against corrosion by the cement at its inner surface and by the covering 16 of rubber-like material at its outside and ends.

Another method of securing the sectional shell to a roll is illustrated in Figs. 3 and 4. One or more circumferential grooves 25 may be turned in the face of the roll 24, preferably near its ends. Blocks 26, 27 may be fitted in the grooves and welded in place to provide a recess 28 therebetween. This may be done at one or more places around the groove. Blocks 29, corresponding in size and shape to the recess 26 may be welded to the sections of the shell on their inner faces so as to interlock with the recesses. The shell sections are then applied to the roll with their blocks 29 inserted in the recesses 28 and the sections are welded to each other as at 30 along their meeting edges.

While the cementing method may be used in some cases, as where the core is impervious and blocks all escape of gases, it is preferred however, to provide a mechanical lock between the core and the impervious metallic shell such as to permit effective venting from between the core and the metallic shell in all cases, such venting to be effected outwardly to the ends of the core or through apertures to the interior of the core or both.

By the provision of such venting in an effective manner, the cushion is protected from intrusion of the gases even in some cases where the shell is not entirely impervious.

To protect the edges of the metal shell from corrosion, the rubber covering 16 is preferably extended over the ends of the shell and a portion of the roll as at 31 and adhered to the end of the shell and the end of the roll. This also provides additional reinforcement to the cushion at its margins.

As a result of the forces upon the rubber covering at its end margins resulting from the circumferential stresses on the covering intermediate its ends in the operation of the roll, checking of the rubber at the margins has sometimes occurred, continuing by cracks started at the checked portions, and it is of advantage to prevent checking of the ends of the rolls and thereby to prevent the starting of cracks. To this end, we prefer to employ a softer rubber composition for the end margins 31 of the roll than is employed along the center or working portion of the roll face, which softer rubber has the ability to yield resiliently to an adequate degree under such forces to avert cracking.

To provide for escape of gases from the core through the space between the shell 21 and the roll core 11, a circumferential groove 32 may be turned in the roll core near its ends and vent openings 33 may be drilled from the groove to meet the openings 17, 18, 19, 20, thereby preventing escaping gas from loosening the rubber where it overlaps the ends of the roll, and providing for escape of the gases to the interior of the roll where they can escape with the condensate.

When a roll previously covered by this method requires recovering, it is only necessary to remove the old rubber covering down to the shell and to replace it with new rubber at a considerable saving of expense over that of covering a roll not having the dense metal layer or shell herein described.

Variations may be made without departing from the scope of the invention as it is defined by the following claims.

We claim:

1. A composite press roll of extensive length for paper-making machines, said roll comprising a load-sustaining roll core of porous cast metal having a substantially circumferentially continuous cylindrical face, a shell structure of non-porous sheet metallic material supported substantially throughout its extent upon said face at closely adjacent areas, means to provide escape for gases along the face of said core to the atmosphere at its ends, said shell having an outer surface adapted to be strongly adhered to rubber-like material, and a circumferentially continuous covering of rubber-like material vulcanized in place upon the shell structure about said core.

2. A composite press roll of extensive length for paper-making machines, said roll comprising a load-sustaining roll core of porous cast metal having a substantially circumferentially continuous cylindrical face, a shell structure of non-porous sheet metallic material supported substantially throughout its extent upon said face, said shell being retained in place under circumferential tension thereof and having an outer surface adapted to be strongly adhered to rubber-like material, a circumferentially continuous covering of rubber-like material vulcanized in place upon said shell structure about said core, and venting means between said core and said shell structure providing for escape of gases to the atmosphere.

3. A composite press roll of extensive length for paper making machines, said roll comprising a load-sustaining roll core of porous cast metal having a substantially circumferentially continuous cylindrical face, a shell structure of non-porous sheet metallic material supported substantially throughout its extent upon said face and welded thereon under circumferential tension, said shell having an outer surface adapted to be strongly adhered to rubber-like material, and a continuous covering of rubber-like material vulcanized in place upon said shell structure about said core.

4. A composite press roll of extensive length for paper making machines, said roll comprising a load-sustaining roll core of porous cast metal having a substantially circumferentially continuous cylindrical face, a shell structure of non-porous sheet metallic material supported substantially throughout its extent upon said face and having an outer surface adapted to be strongly adhered to rubber-like material, said shell comprising a plurality of sections joined edge to edge under circumferential tension, and a continuous covering of rubber-like material vulcanized in place upon said shell about the core.

5. A composite roll for paper-making machines comprising a porous cast metallic core, a shell of non-porous sheet metal about the core, and a covering of rubber-like cushioning material strongly adhered to said shell, said covering extending over the marginal faces of the shell and being adhered to the end of the core.

6. A composite roll for paper-making machines comprising a porous cast metallic core, a shell of non-porous sheet metal about the core and supported thereon substantially throughout its extent, and a covering of rubber-like cushion material strongly adhered to said shell, said core having a circumferential groove in its face near each end adjacent said shell, and said groove being provided with vents extending to an uncovered part of the roll for the escape of gases from between said shell and said core during vulcanization of the cover.

7. A composite roll for paper-making machines comprising a porous cast metallic core, a shell of non-porous sheet metal about said core, and a covering of rubber-like cushioning material upon the shell, said covering having annular zones of appreciably softer rubber-like material at the end margins of the roll than the cushion material between such margins.

ERNEST PETERSON.
ALLAN B. MERRILL.